United States Patent
Redpath

Patent Number: 5,878,425
Date of Patent: Mar. 2, 1999

[54] INTUITIVE TECHNIQUE FOR VISUALLY CREATING RESOURCE FILES

[75] Inventor: Richard J. Redpath, Cary, N.C.

[73] Assignee: International Business Machines Corp., Armonk, N.Y.

[21] Appl. No.: 701,226

[22] Filed: Aug. 21, 1996

[51] Int. Cl.[6] .................................................. G06F 17/30
[52] U.S. Cl. ..................... 707/102; 707/101; 707/103; 395/707; 395/701
[58] Field of Search .................................... 707/102, 100, 707/103, 104; 395/701, 707

[56] References Cited

U.S. PATENT DOCUMENTS

| | | | |
|---|---|---|---|
| 5,600,778 | 2/1997 | Swanson et al. | 395/333 |
| 5,603,034 | 2/1997 | Swanson | 395/701 |
| 5,732,266 | 3/1998 | Moore et al. | 395/651 |
| 5,737,736 | 4/1998 | Chang | 707/102 |

FOREIGN PATENT DOCUMENTS

| | | | |
|---|---|---|---|
| 587394 | 9/1993 | United Kingdom | G09G 3/36 |

OTHER PUBLICATIONS

Software: WERCS, HiSoft, pp. 36—77, The Old School, Greenfield, Bedford MK45 5DE UK, no date.

*Primary Examiner*—Thomas G. Black
*Assistant Examiner*—Greta L. Robinson
*Attorney, Agent, or Firm*—Gregory M. Doudnikoff

[57] ABSTRACT

A technique for permitting the visual building of a resource file is provided. A visual resource file builder file which includes a library of classes which correspond to keywords which may be included in a resource file. By selecting a visual representation of a keyword provided in a builder tool, a user is prompted to input keyword data relative to the selected keyword. Upon saving the input data, an instance of the keyword class (an object) is saved in the resource file. A graphical representation of the saved keyword object is displayed to the user in the graphical user interface for the builder tool. After the user has included one or more keyword objects in the resouce file, the user may convert the resource file into a standard text format resource file which may be utilized by computer programs written in many different computer languages.

5 Claims, 9 Drawing Sheets

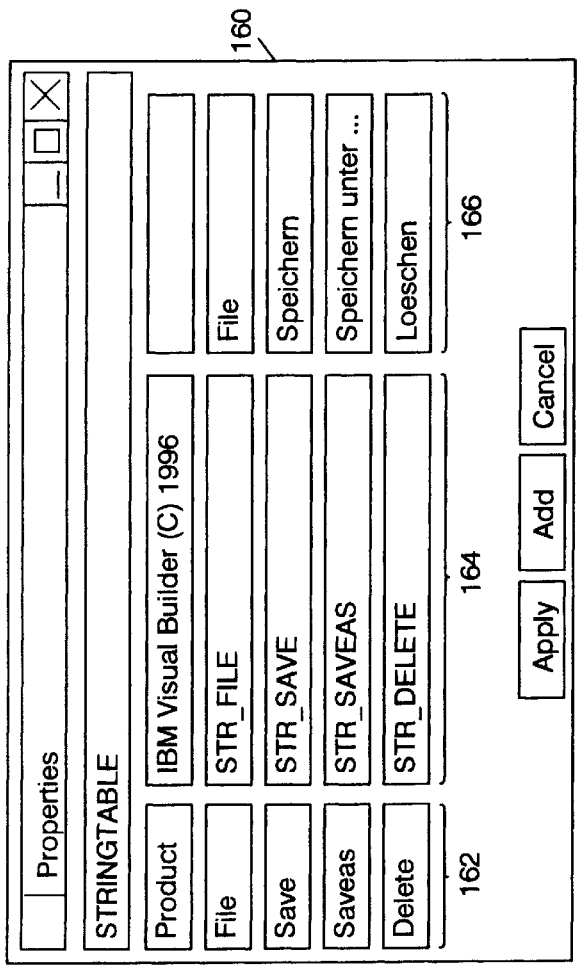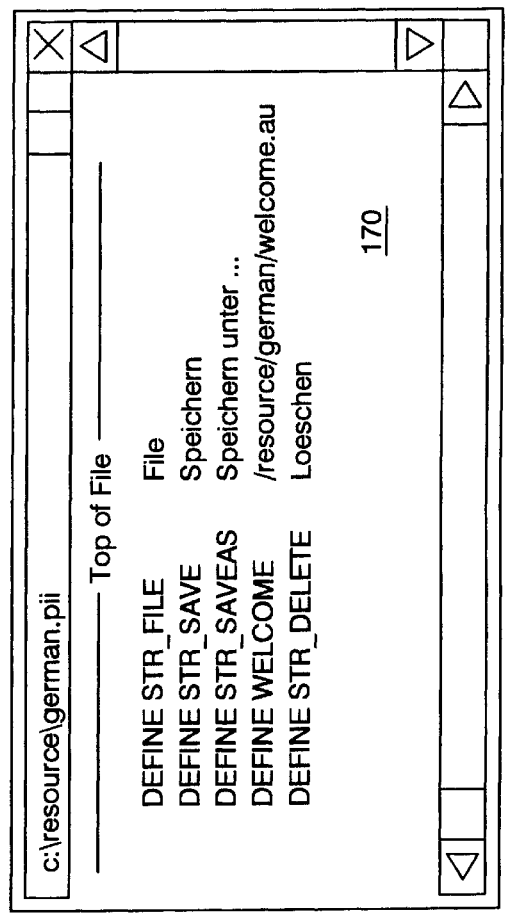

INTUITIVE TECHNIQUE FOR VISUALLY CREATING RESOURCE FILES

BACKGROUND OF THE INVENTION

1. Field of the Invention

The present invention relates to a technique in a data processing system for providing an intuitive graphical user interface for providing a simplified process for creating resource files. More particularly, the present invention provides a technique by which a resource file can be created through a visual model without requiring of a developer any extensive knowledge of the format for a resource file.

2. Description of the Related Art

Computer programs include both logic and data portions. One type of data included in computer programs is known as resources. Resources can include icons, cursors, menus, dialog boxes, certain types of text, audio clips, animation clips, bit maps, etc. Resources are used extensively in graphical user interfaces, multi-media programs, and in permitting national language support, i.e., German, Japanese, and Russian, for providing the ability to present text included in interfaces of programs in different languages.

Resources typically do not reside in a computer program's normal data segment. Resource data is typically maintained in resource files, which are treated separately and differently from other types of program data. For example, when the Windows operating system loads programs into memory for execution, such as programs written in the C or C++ programming languages, the operating system usually leaves the resources on the disk. Windows is a trademark of the Microsoft Corporation. Only when a particular resource is required during the execution of the program does the operating system load the resource into memory.

Some object oriented languages treat resource files somewhat differently. For example, in Smalltalk and ScriptX, resources that will be used by an application or program are converted into data objects, and placed into an object pool or resource pool for use by the application as necessary during execution.

The current state of the art for the creation of resource files is arduous at best. Typically, a text editor of some type is used to create a resource file textually. That is, a developer must write from scratch a text-based file in an appropriate format which includes or calls upon resource data (from existing files, for example). The completed resource file is then compiled into an application being created with the rest of the code for the application. When the compiled application is executed, resource data can be visually inspected for accuracy. If the developer included formatting errors in the resource file while creating the resource file or called on a data file that does not exist or misidentified the name of a resource during the creation of the resource file, this will not be known until the application which includes the resource file is visually inspected during execution.

Additional problems are associated with the existing technique for creating resource files. Developers must know the precise format for resource files. Other than inspecting the text file before compilation, testing cannot be performed until after the resource file is compiled with the application and the application is executed. The latter problem wastes developer time and consumes computing resources, as compiling and executing an application can take significant amounts of time.

Additionally, resource files are a prime technique by which national language support is provided. When compiling an application, using resource files which include German text (as opposed to English text) produces a German language application. The process for providing national language support typically includes having a translator translate text portions of resource files into a desired language. However, the process for performing translations on resource files is often time consuming and complicated. Only certain elements from a resource file must be translated. But since standard resource files are text files, it is difficult to segregate out the portions which need translation. Further, compiling and execution of the program are required before the translation can be reviewed in context within the application for finding errors. The whole translation and error checking process is time consuming and thus quite expensive. Thus, producing a translated version of a program is quite arduous.

Accordingly, a need exists for a technique for permitting simplified creation of resource files having a format such that handling of resource files and review of data included in the created resource files are simplified.

SUMMARY OF THE INVENTION

An object of the present invention is to provide a visual tool for enabling the creating of resource files.

Another object of the invention is to provide a technique for permitting a developer who does not have in-depth knowledge of the required formats to build resource files.

Still another object of the invention is to provide a resource file building tool which automatically updates components of the resource file which are affected by changes made to other components.

Yet another object of the invention is to provide a resource file building tool which permits easier inspection for errors prior to compiling.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a resource file builder tool including computer readable code included on media for enabling the creation of resource files, comprising: a class library including a keyword class for each keyword includable in a resource file being developed, each of the keywords having a selectable iconic representation displayable in a graphical user interface of the resource file builder tool; first subprocesses for permitting a user to select one of the keyword classes by selecting one of the iconic respresentations; second subprocesses for prompting the developer to input keyword data for the selected keyword class; and third subprocesses for saving an instance of the selected keyword class having the input keyword data as instance data within the resource file. The resource file builder tool, may further comprise fourth subprocesses for determining whether the saved instance data affects the instance data for any other saved instance of any of the keyword classes within the resource file, and updating the instance data which is affected.

The present invention also provides a visual resource file builder tool comprising computer readable code stored on media for permitting a developer to visually construct a resource file, comprising: a plurality of keyword classes, one for responding to each keyword includable in a resource file being developed; selectable visual representations of each of said keyword classes; first subprocesses for creating a properties sheet for display to the user which prompts the user to input keyword data upon selection of a visual represenation of a keyword class; second subprocesses for creating a keyword object of the keyword class after the developer has input keyword data into the properties sheet and saved the properties sheet, the keyword object including the input keyword data; and third subprocesses for creating a visual representation of the saved keyword object for display. The visual resource file builder tool may further comprise fourth subprocesses which determines whether input keyword data saved with the keyword object affects other keyword data in any other keyword object, and updates the other keyword data in the other keyword objects if the keyword data is affected. Alternatively, the visual resource file builder tool may further comprising fifth subprocesses which, upon selection of the visual representation of the keyword object, displays the properties sheet for the keyword object for permitting the user to modify the keyword data previously saved with the keyword object.

The present invention may further provide computer readable code for visually displaying, in a graphical user interface of a resource file builder tool, a selectable graphical representation corresponding to each keyword included in a resource file, comprising: first subprocesses for creating and displaying a visual object in the graphical user interface corresponding to each keyword upon saving of each keyword; second subprocesses which, upon selection of one of the visual objects, displays a properties sheet for the keyword which corresponds to the selected visual object, the properties sheet including keyword data and the keyword data being modifiable; and third subprocesses for permitting a user to modify the keyword data for the selected keyword by modifying the keyword data included in the properties sheet.

Additionally, the present invention provides computer readable code for providing national language support for an application using multiple resource files and a visual resource file builder which permits the review of a translated text in context prior to compiling or building the application, comprising: a first resource file including a define keyword having define data which defines text in a target language for predetermined strings; and a second resource file displayed in a visual format including visual representations for each keyword and its keyword data included in the second resource file, the second keyword file including via an include keyword said first resource file and visually illustrating strings which are translated by the define keyword data in said first resource file as keyword data for a stringtable keyword included in said second resource file.

The present invention will now be described with reference to the following drawings, in which like reference numbers denote the same element throughout.

BRIEF DESCRIPTION OF THE DRAWINGS

FIG. 8 illustrates the properties sheet for the stringtable keyword;

FIG. 9 illustrates a standard text resource file which includes German translation data.

DESCRIPTION OF THE PREFERRED EMBODIMENT

Figure 1:
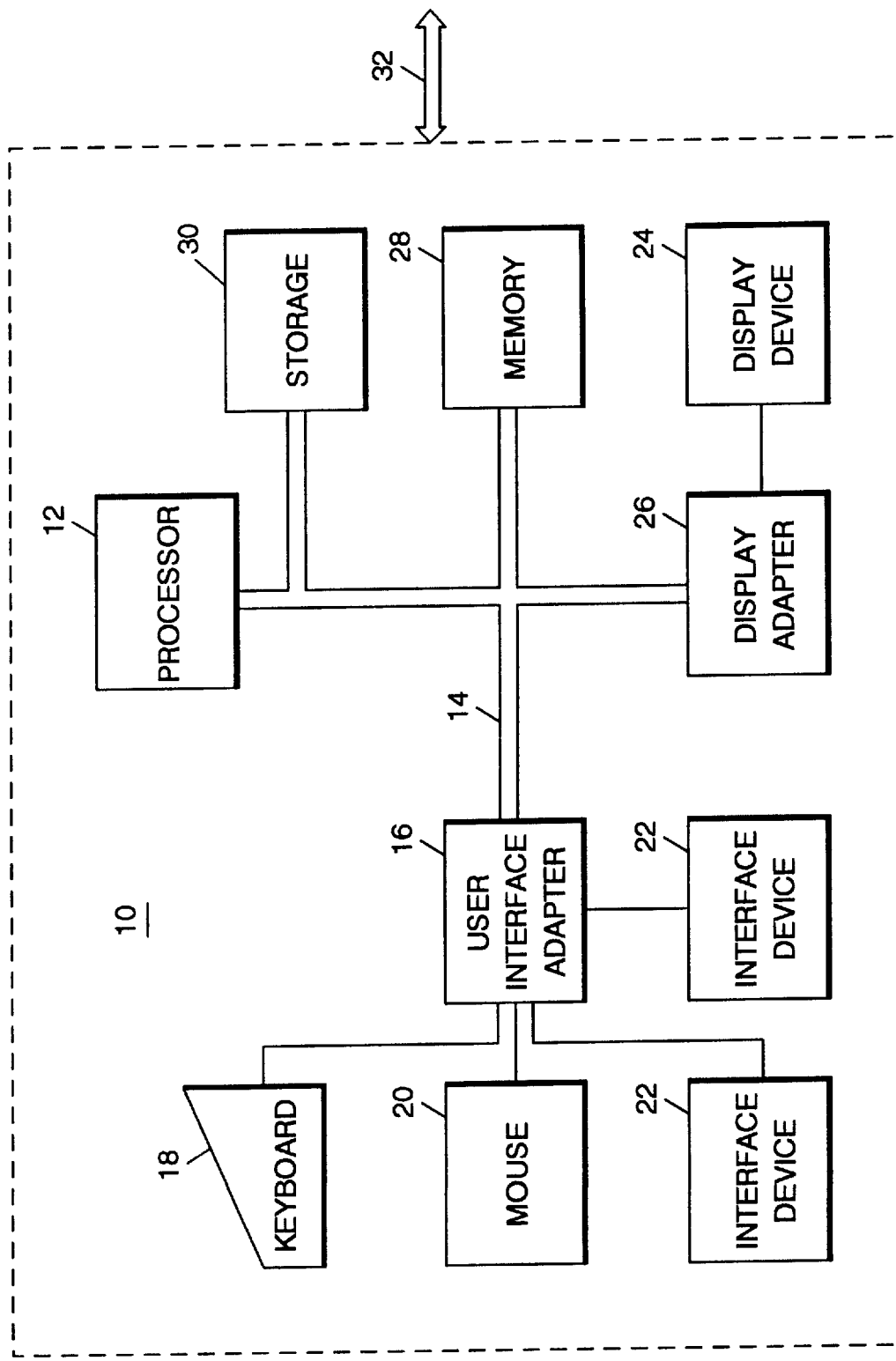
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30, which can include a hard drive, tape drive, etc.

The workstation 10 communicates via a communications channel 32 with other computers or networks of computers. The workstation 10 may be associated with such other computers in a local area network (LAN) or a wide are network, or the workstation 10 can be a client in a client/ server arrangement with another computer, etc. All of these configurations, as well as the appropriate communications hardware and software, are known in the art.

Figure 2:
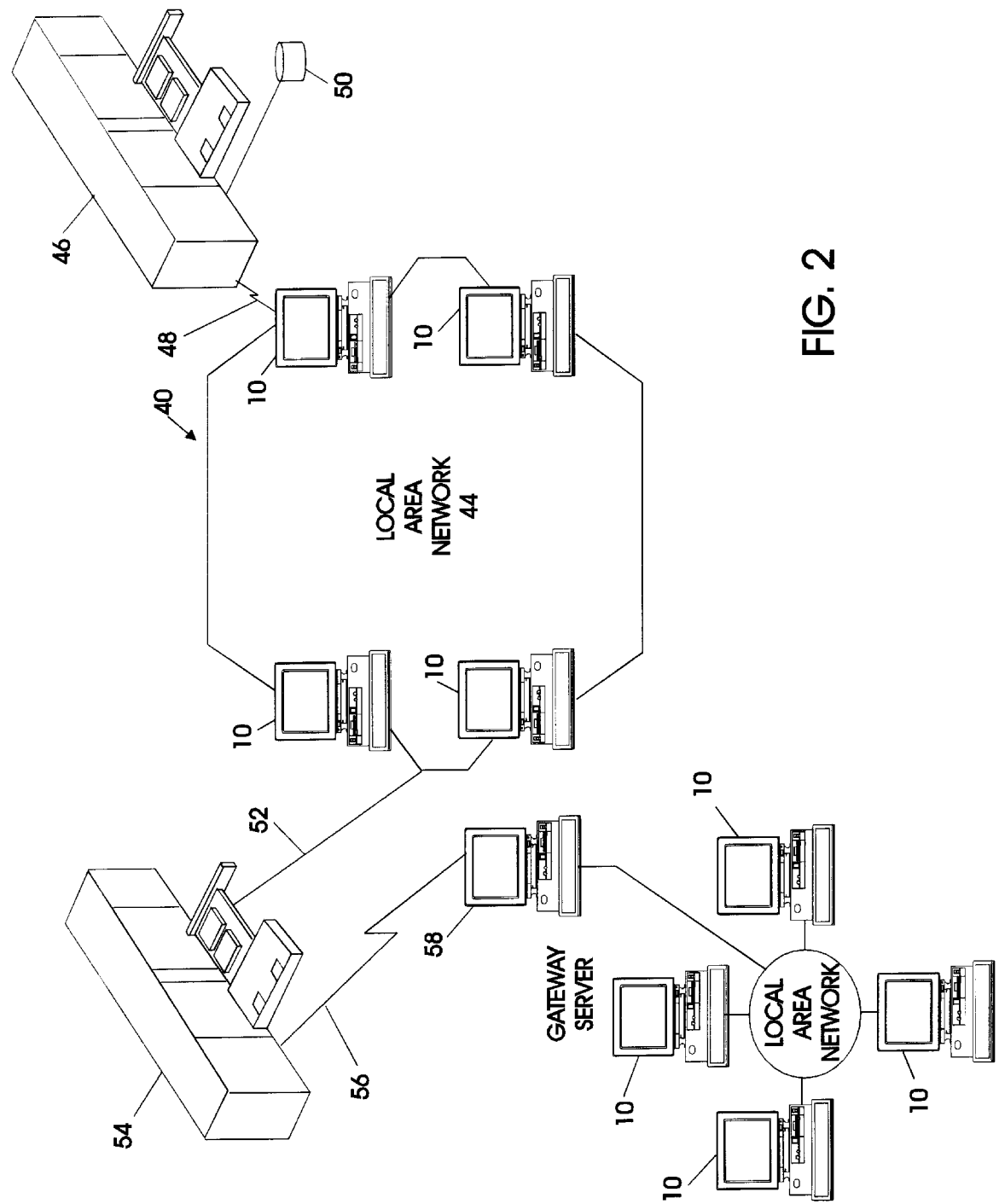
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Applications System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 10.

In the preferred embodiment, the present invention is implemented in the Java programming language. Java is a trademark of Sun Microsystems, Inc. Java is an object oriented language which has been enhanced for use in conjunction with the Internet. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created; the copy or instance of a class is known as an object.

A developer may manipulate and utilize classes in a number of ways, depending on the features of the individual language. For example, most object oriented classes have a number of basic characteristics, including encapsulation, polymorphism, and inheritance. Through polymorphism, a software component or object may make a request of another object without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object oriented programming techniques, are well known to those skilled in the art, and will not be discussed in depth herein. While the present invention will be described in terms of a tool for building a resource file which is written in the Java programming language, the present invention may be implemented by a skilled programmer in other programming languages.

Figure 3:
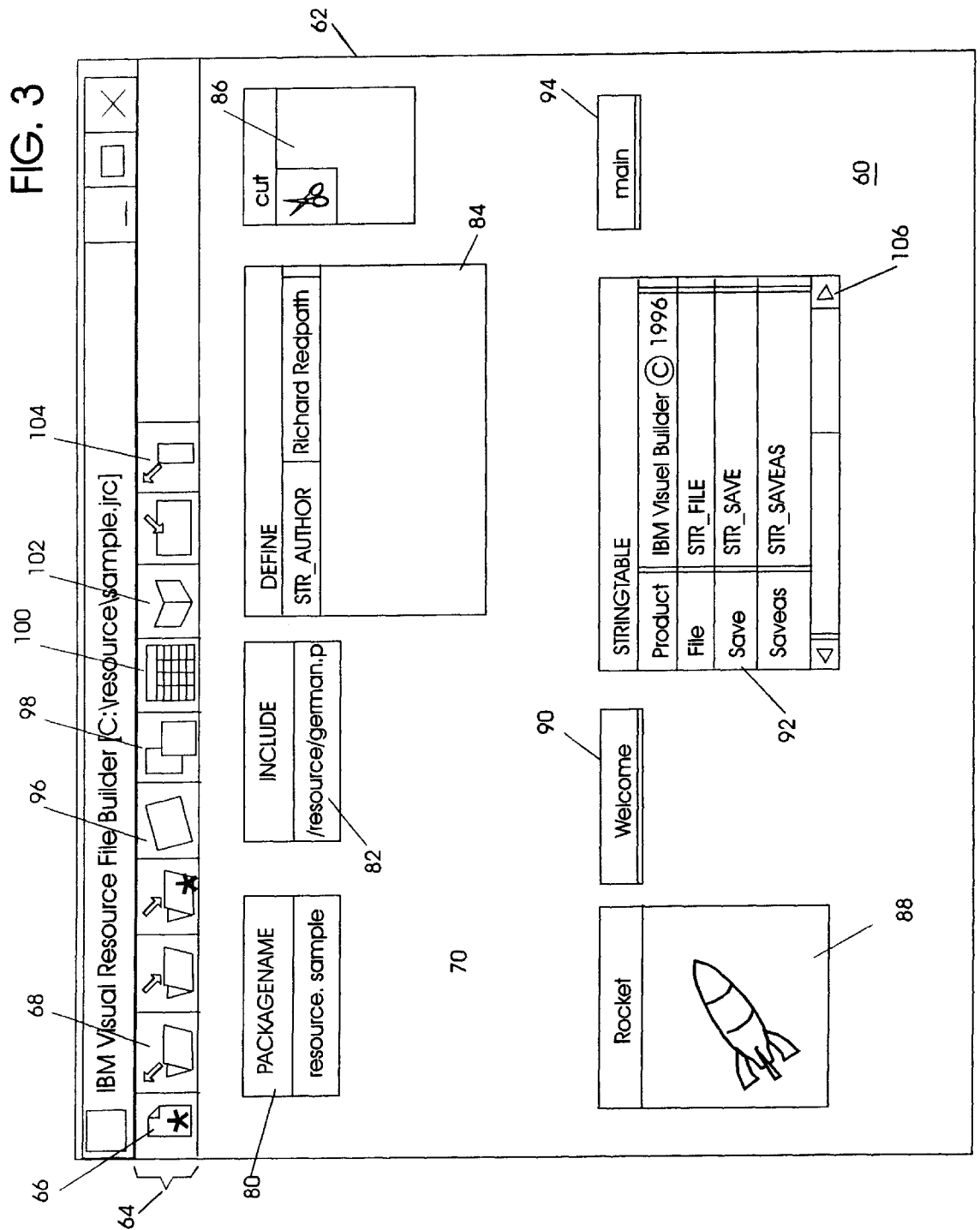
FIG. 3 illustrates a graphical user interface for a visual resource file builder according to the present invention.

FIG. 3 present a graphical user interface (GUI) 60 for a visual resource file builder tool according to the present invention within a window 62 displayed on a monitor. According to the preferred embodiment, the builder tool is written in the Java programming language. Thus, the builder tool will operate in any operating system or other user environment in which the Java run-time environment has been embedded or included. The GUI 60 includes a tool bar 64 which includes iconic representations of common functions, such as "open new file", "close file", etc., as well as iconic representations of resource file keyword elements which correspond to types of resource data that a developer may desire to include in a resource file. A standard text resource file typically comprises one or more data elements of the same or different types. Keywords are used to define the types of resource data, and each keyword represents a different type of data. Each keyword also has its own format associated therewith. A typical text resource file 110 is illustrated within a window 112 of FIG. 4. The resource file includes keywords 114, such as "INCLUDE", "SOUND", "STRINGTABLE" and "MENU", and their formatted data and data references and formal format spacing capitalization and strings.

The builder tool includes a class library which comprises a Java class which corresponds to each keyword. The corresponding Java class is created relative to each keyword to be a keyword shell. In other words, the appropriate format for each keyword is written into the Java class. Also written into the Java class for each keyword is a means for having the developer provide the appropriate information necessary for the keyword to be complete and usable within a resource file. In the preferred embodiment, each keyword class includes a properties sheet, which is displayed to the developer when the developer wants to create or modify a keyword and its data. The properties sheet for each keyword requests from the developer only the specific data necessary to complete the keyword data. For example, for an "include" keyword, the corresponding properties sheet prompts the developer to input the location and name of a file to be included in the resource file. The developer does not have to worry about any other formatting considerations with respect to that keyword, such as spacing, closing statements, etc. The developer actually adds an instance of a particular Java keyword class (an object) into a resource file when the keyword class is saved. The class itself remains available in the builder tool for reuse; the object of the class is populated by the developer with instance data via the properties sheet, which is the resource data or resource data information for the keyword.

It should be remembered that there are a large number of keywords which relate to a specific type of data file, such as sound, an animation clip, a menu, etc. New types of data and corresponding keywords may be created with the passage of time. Since the visual resource file builder is written with Java, it would be relatively easy to modify the builder tool by adding new sets of classes which enable the tool to create other keyword objects.

The tool bar 64 is a common paradigm in visual building tools. The icons in the tool bar 64, also known as objects, represent callable functions which are common to most files, such as save, open file, etc. Additionally, some of the icons in the tool bar 64 represent keyword classes which can be used to create keyword objects for a resource file. In this builder tool, the visual objects and their function happen to be enabled via instances of Java classes, which are also known as objects. The visual object is thus distinguished from the underlying Java object, which comprises actual Java code and includes code for the visual object. This visual building paradigm is common to many tools which create files of one kind or another, such as word processors, power tools, etc. Accordingly, the details for creating such an interface itself will not be discussed, as such as within the purview of a skilled programmer. Rather, the function of a visual resource file builder tool according to the present invention is discussed with reference to the flowchart of FIG. 5. From the discussion, a skilled programmer would be able to implement the invention.

With the visual resource file builder tool opened for use by a developer, a developer may begin creating a new resource file by selecting a "new file" icon 66 from the tool bar 64 (Step 100). Upon selection of the "new file" icon in Step 100, an empty new resource file is created, and the developer is prompted to provide a name for the new resource file (Step 102).

Alternatively to the selection of the "new file" icon in Step 100, the developer may reopen an existing resource file by selecting an "open existing file" icon 68 for accessing an existing resource file (Step 104). The developer is then prompted to provide the name of an existing resource file, and upon entering a valid name, the existing resource file is opened within a work area 70 of the visual resource file builder tool (Step 106). A visual representation of a resource file comprising a number of visual keyword objects is illustrated within the work area 70.

The developer then has a number of options relative to the creation of a new resource file or the modification of an existing resource file. As per Step 108, the developer may add a "package name" keyword to or modify an existing "package name" keyword within the resource file. The keyword "package name" has relevance only for applications written in the Java language. Sets of Java classes are typically grouped in what are referred to as packages. Accordingly, if the developer desires that the resource file being created will eventually be turned into a Java class, it may be appropriate to specify a Java package with which the resulting Java class is to be associated. If the resource file is not to be turned into a Java class, then the developer need not utilize the package name option. Typically, a Java class belongs only to a single package. Thus, it is appropriate that only a single package name be provided.

Figure 6:
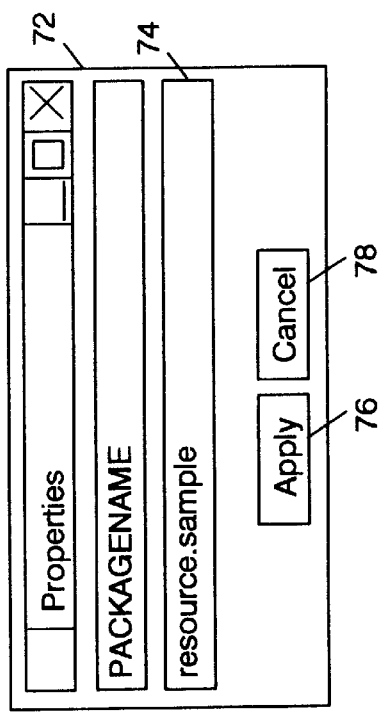
FIG. 6 illustrates the properties sheet for the package name keyword.

If the developer selects the "package name" icon from the tool bar 64, then the builder tool first determines if a "package name" object has already been created for the open resource file (Step 110). If it is determined in Step 110 that a "package name" object is already present within the resource file, then the builder tool will cause an existing properties sheet from the package name object to be displayed for editing. A properties sheet 72 for the package name keyword is illustrated in FIG. 6. The properties sheet 72 for the package name keyword includes a data entry field 74 in which the previously input Java package name with which the resource file is to be associated is displayed. Through the data entry field 74, the developer may input a new name of a Java package with which the resulting resource file is to be associated after conversion to a Java class.

Alternatively, if it is determined in Step 110 that no package name object already exists within the resource file, the builder tool creates an instance of the package name class (package name object) and displays empty new properties sheet for the package name object (Step 114) so that the developer may input a package name (instance data). Whether or not a package name object was already in existence for the resource file, the processing for both situations proceeds to Step 116, in which the developer has the option to modify the properties sheet, which for the case of the package name property sheet, is by inputting a new package name or modifying the existing package name within the data entry field 74. If the developer inputs a package name into the package name properties sheet in Step 116, the developer then has the option of selecting an "apply" button 76 or a "cancel" button 78 (Step 120). If the developer selects the apply button 76 in Step 118, the name input to the data entry field 74 is saved as instance data in the new package name object or to modify the existing package name object, as appropriate, and the instance of the Java "package name" class having the provided name, which is instance data for the Java object, is saved with the resource file. The Java object includes code for a visual representation (package name object) 80 which is displayed within the work area 70 whenever the visual resource file representation is open within the builder tool. The properties sheet is then closed (Step 122). Since the package name object is not an object which requires reconciling with other objects in the resource file (Step 124), processing proceeds to Step 128.

Alternatively, if a developer selects the cancel button 78, whether or not the developer input any changes or new data to the data entry field 74 (Step 120), the package name properties sheet 72 is closed, and any modifications input to the data entry field 74 are not saved. Additionally, if no prior package name object was in existence and no data was input to the data entry field 74, no package name object will be saved within the resource file being created (Step 126). If a package name object already existed, then that object will be maintained within the resource file, but without any changes.

The developer may also select a "close file" option in Step 128. The selection may be made after the package name object has been created or modified in Step 122, after the close sheet (cancel) option has been selected in Step 120, or made in lieu of the close sheet option. If the close file option is selected in Step 128, the resource file is closed, and any modifications not "applied" are not saved, and if no name has been provided into the data entry field for a new package name object, no package name object will be saved (Step 130). Processing then returns to the beginning of the creation process, and the developer may begin creation of a new resource file (Step 100), open an existing resource file (Step 104), or close the visual resource file builder altogether (Step 132), which will bring processing to an end.

The process discussed relative to Steps 114 through 132 applies to all of the other types of keyword objects which a developer may add to the resource file. Steps 110 through 112 do not apply to the processing of keywords other than the package name keyword, because more than one of the other keywords can exist within a single resource file.

The visual representation of a resource file is graphically illustrated within the work space 70 of the resource file builder tool. A graphical keyword object is provided as a visual representation of each keyword-based component included in the resource file. For example, in the resource file illustrated in FIG. 3, the resource file includes the visual package name object 80, a visual "include" object 82 (representative of the fact that an "include" keyword is part of the resource file), a visual "define" object 84, a first visual "image" object 86, a second visual image object 88, a "sound" object 90 (indicating that a sound clip is included in the resource file), a visual "stringtable" object 92, and a visual "menu" object 94. Other than the package name keyword, most other keyword types may be included more than once in a given resource file. For example, two image keywords are included in the resource file graphically illustrated in FIG. 3. Additionally, each visual object includes visual representation which indicate to the developer the type of keyword it represents and an indication or portion of the resource data associated with the keywords, as can be seen in FIG. 3. For example, the second image object 88 includes the image which is associated with the second image keyword in the resource file. The include object 82 provides the name of the keyword (include) and the name of the file it is incorporating into the resource file (\resource\german.pii).

Figure 5A:
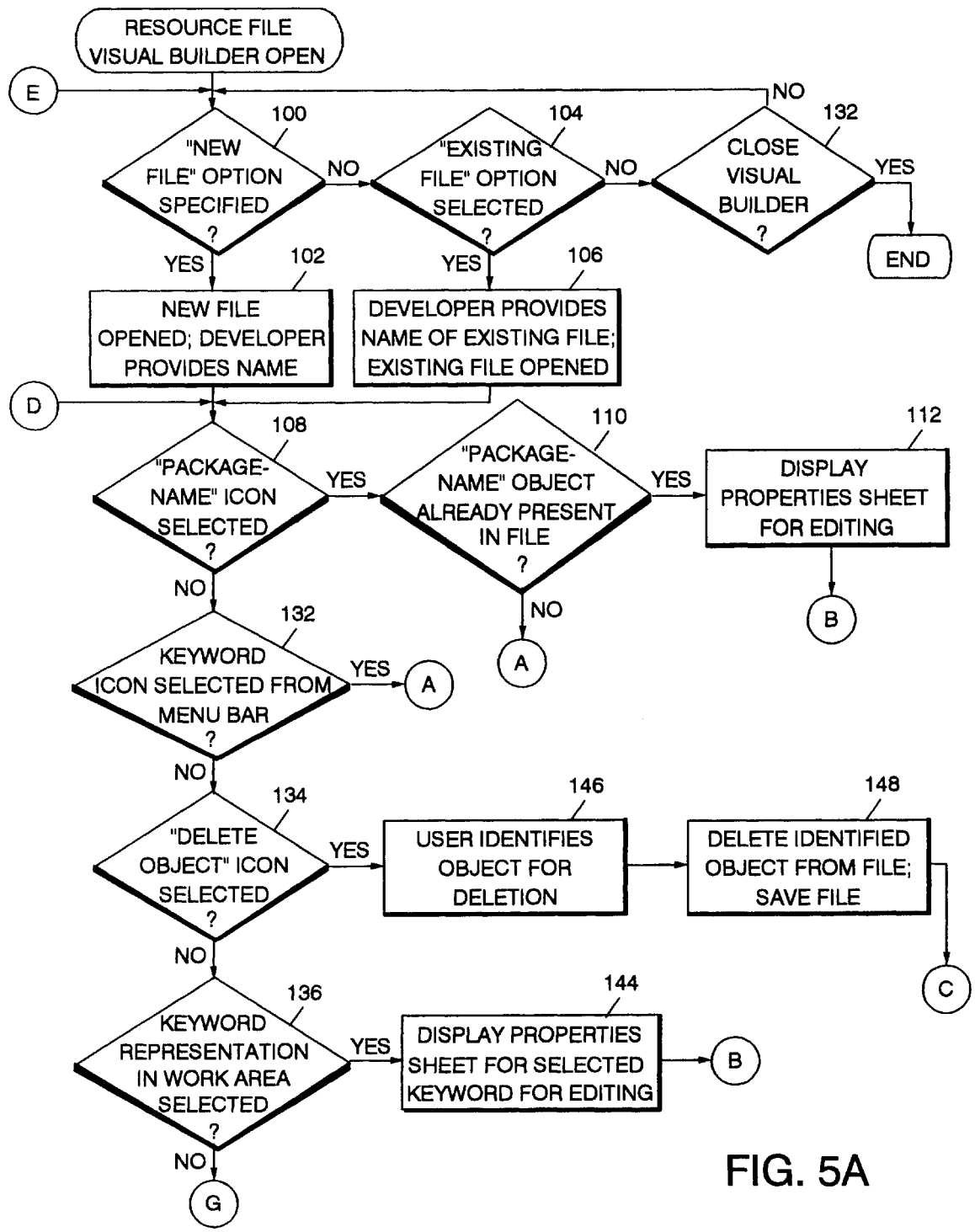
FIGS. 5A–5B illustrate a flow chart of the logical processes of the visual resource file builder tool in accordance with the present invention.
Figure 5B:
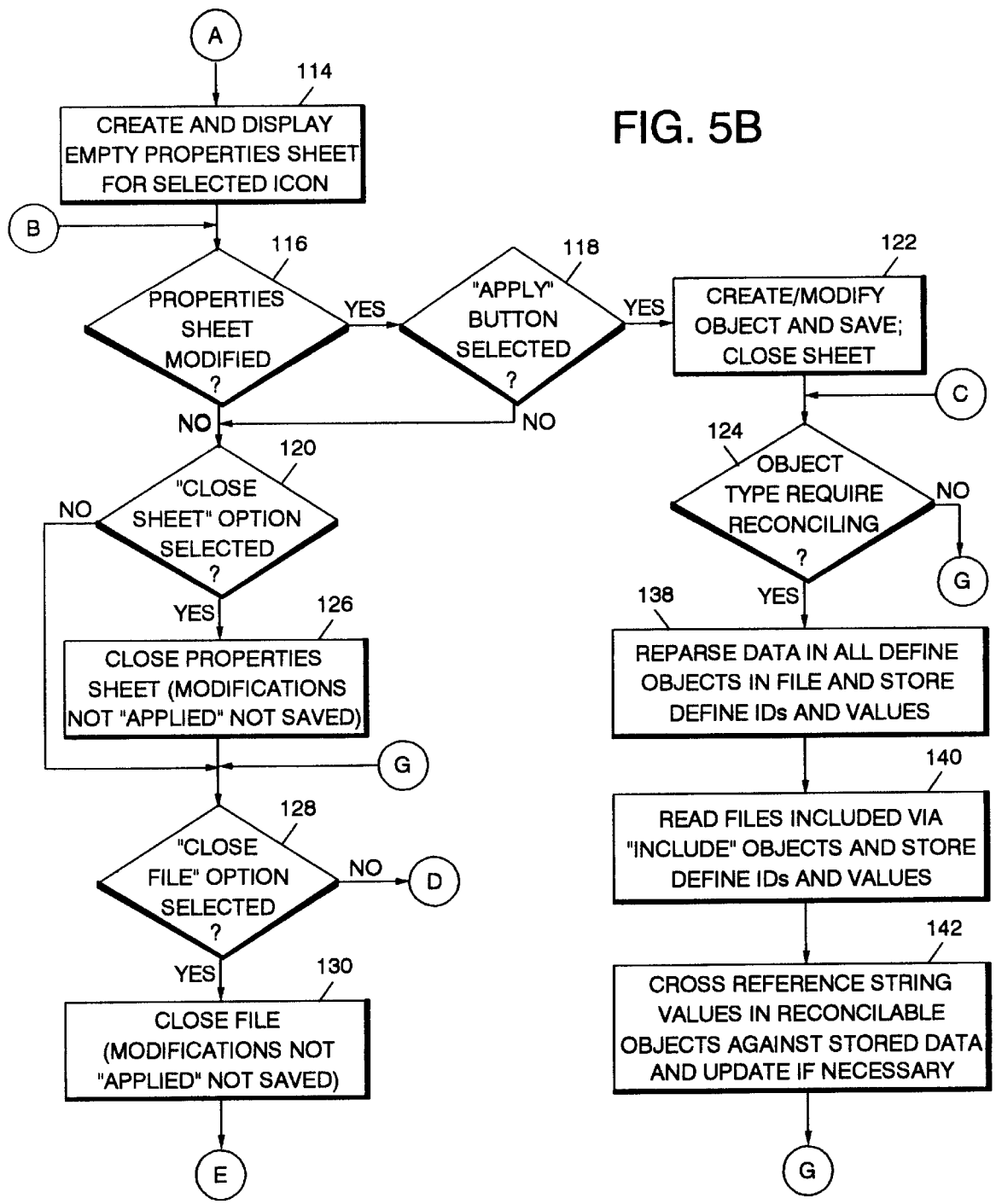

Referring once again to the flowchart of FIG. 5, after a new file is opened in Step 102, or after an existing file is opened in Step 106, or after processing relative to a properties sheet for a keyword is completed in Step 128 (and the developer wishes to continue processing the file), the developer has a number of options, as indicated by Steps 132, 134 and 136. As per Step 132, the developer may select a keyword icon from the tool bar 64. If the selected keyword icon is a keyword icon other than the package name icon, such as an include icon 96, a define icon 98, a stringtable icon 100, or a menu icon 102, then the process continues as described for the selected keyword in the manner previously described in Steps 114 through 130. The properties sheet and the resulting visual object are designed in a custom manner for each keyword to enhance ease of use. Additionally, a reconciliation process is added such that if a change is made to a properties sheet (instance data) for one keyword that affects the data for another keyword, the data for the other keyword is automatically updated. This process will now be addressed relative to other keywords.

Figure 7:
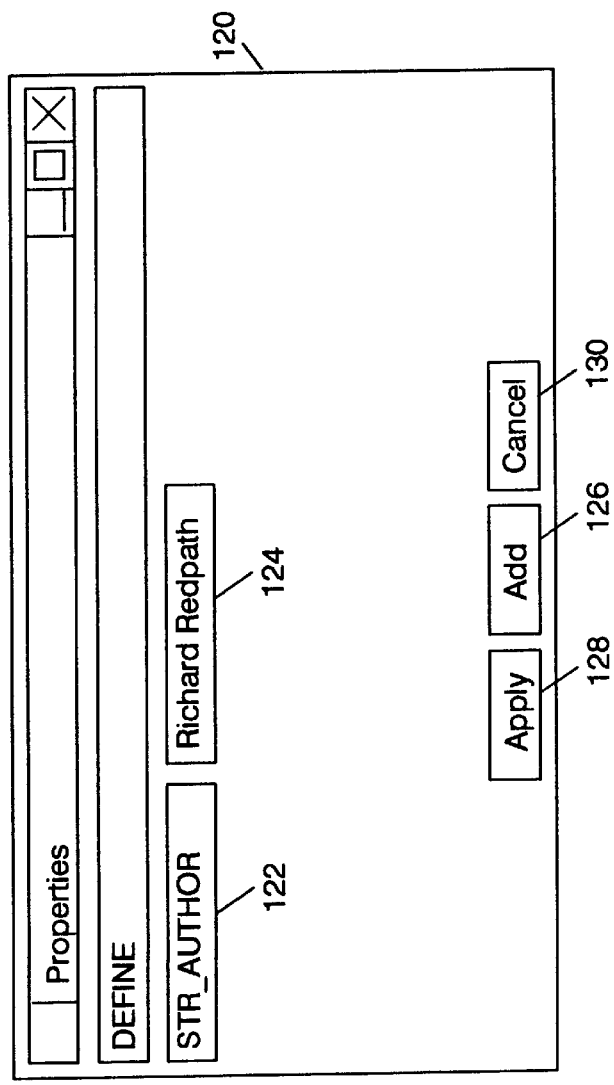
FIG. 7 illustrates the properties sheet for the define keyword.

As per Step 132, when the developer selects the define icon 96 from the tool bar 64, an instance of the Java class for the define keyword is created, and an empty properties sheet for the define object is presented within the work area 70 (Step 114). A properties sheet 120 for the define object is illustrated in FIG. 7. Data for the define keyword essentially acts as a macro. The developer defines a string and then provides a value for the string, such that wherever the string is used within the resource file, the defined value will be visually represented in the visual resource file (and application in which the resource file is utilized) in place of the string. In the properties sheet 120, strings are placed in a first column and their corresponding values are placed in a second column. The properties sheet 120 illustrates a single string 122 in its first column, "STR_AUTHOR", and a value 124 for that string in its second column, "Richard Redpath". The developer modifies the properties sheet 120 for the define object by modifying text in the existing entries in the first or second columns, or selecting an "add" button 126, which causes blank data entry fields to be displayed in the first and second columns, respectively, into which the developer may input a new string to be defined and a corresponding value. After entering new data into or modifying the properties sheet 120 as described above (Step 116), the developer may select an "apply" button 128 (Step 118). If the developer so selects the apply button 128, then the instance of the define object is saved, and the properties sheet 120 closed (Step 122).

Define keywords are by definition macros which are created to affect other types of keyword included in a resource file. Accordingly, define keyword objects require reconciling as per Step 124. As per Step 138, the data from all of the define objects in the resource file is parsed and stored in memory. Further, any files which are included in the resource file via an include object is read, to determine whether any define objects are included therein. If so, the define strings and their corresponding values are also stored in memory (Step 140). Next, all strings which are part of any keyword object within the resource file are checked against the strings and their stored values stored in memory. If the value for a particular string has been changed, then the new value is stored as instance data within the checked keyword object, replacing the old value. Thus, any modifications to a string value which is saved relative to one keyword object will be immediately reflected in other keyword objects (Step 142).

Like the package name keyword example, if the developer does not modify the properties sheet in Step 116 and selects a "cancel" button 130, or after modifying the define properties sheet 120 does not select the apply button 128 and instead selects the cancel button 130 (Step 120), the properties sheet is closed and any modifications made thereto are not saved (Step 126). Following Step 142, the properties sheet 120 is closed, and processing proceeds to Step 128. In Step 128, if the developer selects a close file option, the file is closed, and modifications not applied are not saved (Step 130). If the developer does not close the file, processing returns to Steps 132, 134, 136 and the developer may select any of those options.

As per Step 136, should the developer select one of the existing keyword objects within the resource file for processing, such as by double clicking on a visual object, such as the visual representation 84 of a define object, the properties sheet for that particular instance of the selected object is displayed for editing (Step 144). Processing then continues in the manner described above relative to the displayed properties sheet beginning with Step 116.

Alternatively, as per Step 134, the developer may select the delete icon 104 from the tool bar 64. Upon such a selection being made, the builder tool displays a list of keyword objects which exist within the resource file. The developer may then select one or more keyword objects within the list for deletion (Step 146) and then, upon selection of an apply button, the identified object or objects are deleted from the resource file, and the modified version of the resource file is saved (Step 148). It is then determined in Step 124 if the deleted object(s) could have contained information that was used by other keyword objects in the resource file (Step 124). If so, Steps 138–142 are repeated, and data contained in other keyword objects is reconciled and updated as appropriate, after which processing proceeds to Step 128. If no reconciliation is required, such as if the keyword object was the package name object, then processing proceeds to Step 128 directly and continues in the manner previously described.

The present invention also provides a simplified technique for providing translated applications, also known as national language support. Preferably, text resource data which will be displayed to the end user is maintained in resource files as string data. As such, by changing the value for a string in a define keyword object, the string value can be modified without affecting the rest of the logic or data in the application. Thus, by providing a define keyword object which defines strings in German, string values will be displayed to end users of an application in which the resource file is included in German. Further, by keeping the define keywords for strings which are translated in separate resource files, only the separate resource file must be provided to a translator. Thus, the full resource file is not provided to a translator, and the chances of a translator accidentally modifying non-translation resource data are reduced.

FIG. 8 illustrates a properties sheet 160 for the visual stringtable object 92 of FIG. 3. The properties sheet 160 is similar to the properties sheet for the define keyword object, but instead of two columns, a third column is provided, for identifying an extra level of indirection. Like the define keyword data, the stringtable keyword data also acts as a macro. However, in this case, strings may be defined either directly or indirectly. The string "product" found in a first (string) column 162 is provided with a direct value, "IBM Visual Builder (C) 1996" in a second (define) column 164, and thus with no value in a third (indirect value) column 166. However, the remaining strings in the first column 162 are defined by strings in the second column 164. These strings are defined in define keyword data contained in a separate translation resource file "included" in the sample.jrc resource file by the include keyword object represented by the visual object 82 of FIG. 3. A text version 170 of the German translation resource file which defines the German translations for the strings in its define keyword data is illustrated in FIG. 9. By simply providing the translation resource file 170 to a translator, the appropriate translation can be made without requiring the transfer of large, cumbersome files or risking the modification of the wrong data. The translated resource file 170 is simply incorporated into the sample.jrc resource file illustrated in FIG. 3 via the include keyword object. Through the reconciliation process, the values provided by the translated resource file 170 can be viewed in the stringtable object 92 (by utilizing the horizontal scroll control 106) to view the third column of the stringtable object 92) or by viewing the properties sheet 160 of FIG. 8 for the stringtable object 92. Thus, the translation as it will affect the application can be viewed within the work area 70 prior to the application which includes the resource file illustrated in the work area 70 being compiled and executed.

The exact format of the properties sheet for each potential keyword which may be added to a resource file using the visual builder tool is varied, as is the corresponding visual object which is displayed in the work area 70 of the resource file visual builder tool. Both the actual visual object and properties sheet for a keyword should readily identify the keyword and provide some kind of indication as to the data which is being included in the resource file via the keyword. It is anticipated that as new keywords are created, a new Java class for each keyword will be added to the visual builder with an appropriate properties sheet and visual object.

Figure 4:
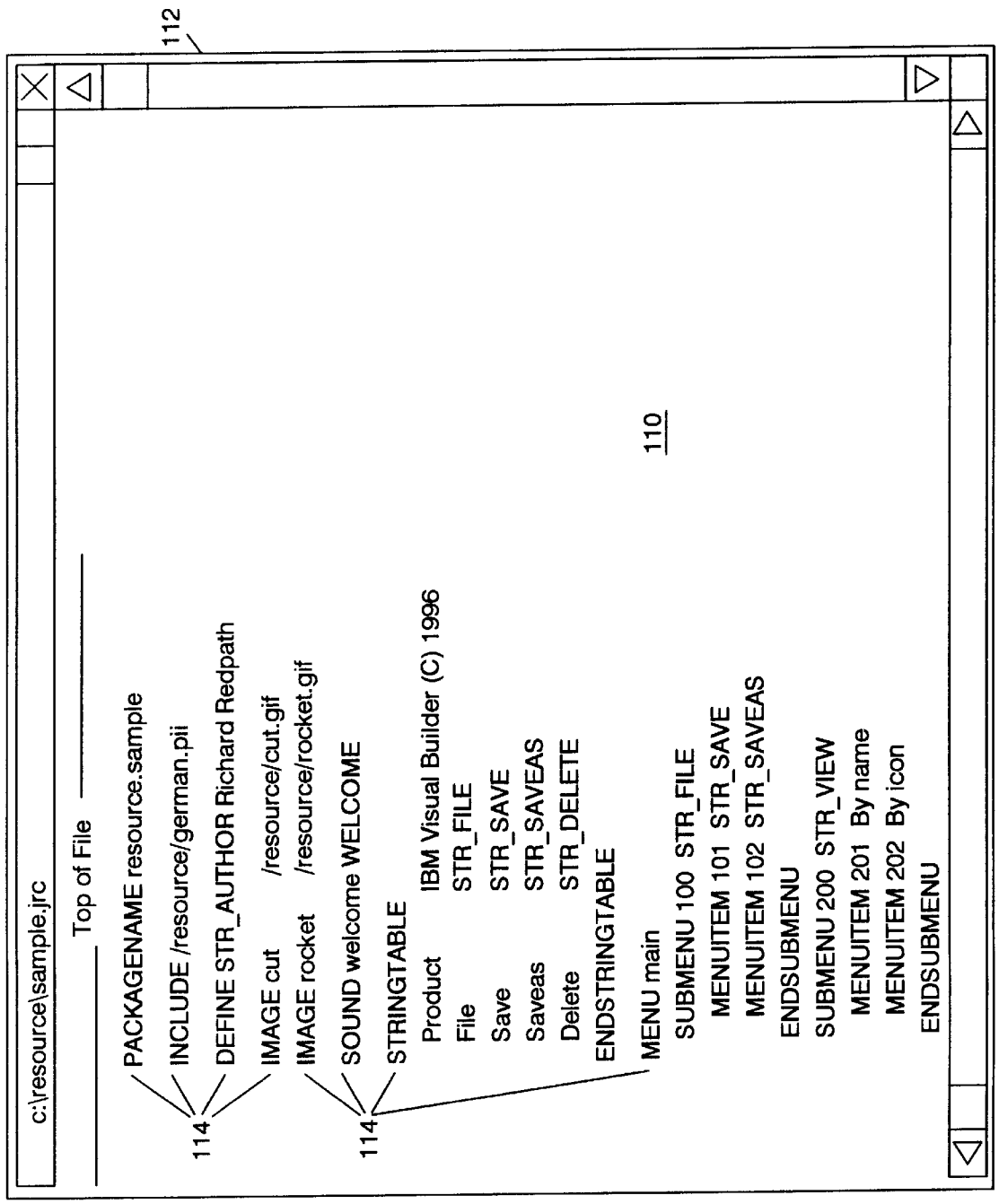
FIG. 4 illustrates a standard text resource file.

Upon completion of the resource file by the developer, it is necessary that the Java language visual resource file be converted into a standard format resource file which is useable by applications written in any of a variety of languages. Such a text resource file is illustrated in FIG. 4. The file illustrated in FIG. 4 corresponds to the visual format resource file illustrated in the work area 70 of FIG. 3. The visual builder tool is programmed with a mapping function for converting the Java keyword objects which comprise the visual resource file into a text resource file which conforms to established standards for text resource files. Basically, during the conversion process, the builder tool takes the data input by the developer and places it within the required keyword structure for a text resource file. This required structure is known in the art, and the mapping function places the input data into the appropriate position within the structure.

Figure 10:
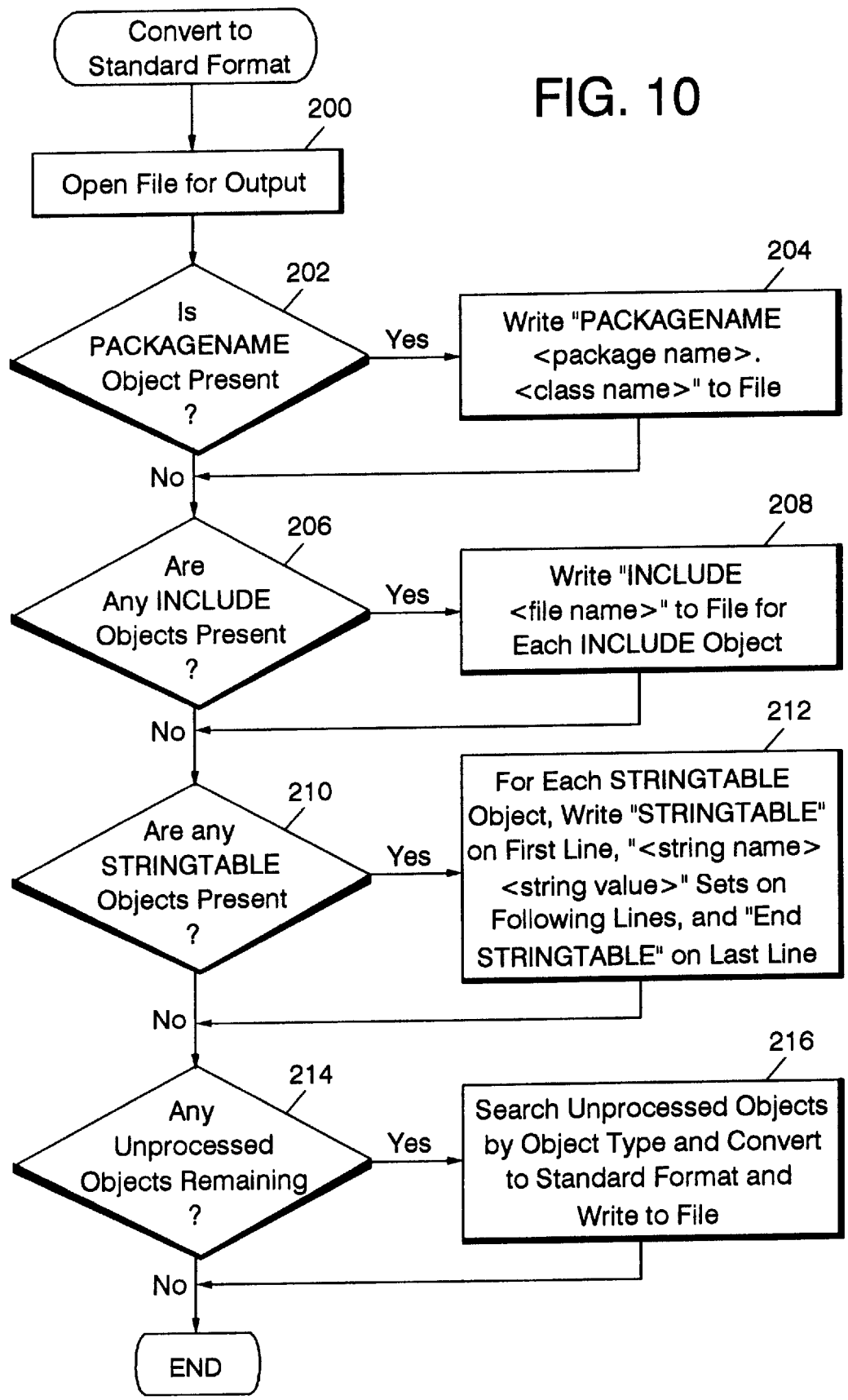
FIG. 10 illustrates a flowchart of the logical processes for converting the visual format resource file into a standard text resource file.

The flowchart of FIG. 10 illustrates the logical process by which a visual format resource file is converted into a standard format resource file. First, a file into which the resulting standard format resource file will be output upon conversion is opened (Step 200). Next, the visual format resource file is searched to determine whether or not it includes a package name object (Step 202). If it does, the phrase "PACKAGENAME <package name>.<class name>" is written into the file (Step 204). "Package name" is the name of the Java package in which the resulting Java resource class will be included and "class name" is the name of the class for the resulting Java resource class. If no package name object exists or upon completion of Step 204, processing proceeds to Step 206.

Next, the builder tool determines whether any include objects are included in the visual format resource file (Step 206). If so, the tool writes "INCLUDE <file name>" to the output file for each include object (Step 208).

If no include objects exist in the resource file or after all include objects have been converted, processing proceeds to Step 210. In Step 210, it is determined whether any stringtable objects exists within the visual format resource file. If so, then for each stringtable object, the builder tool first writes the name "STRINGTABLE" to the resource file, and then on subsequent lines writes sets of each string name and its corresponding string value (one set per line). As discussed above, the string value may be a variable, such as STR_FILE, for which a value is defined in define keyword data. After each string name and its corresponding value has been written into the output file, the format for the stringtable keyword is completed by writing "END STRINGTABLE" in the line following the last set of values, which denotes the end of the stringtable keyword data (Step 212).

As indicated by Step 214, processing continues in this manner for all the remaining unprocessed keyword objects within the Visual format resource file. Given the above description and the fact that the standard keyword formats are known, it is within the purview of skilled programmers to write the appropriate code which would enable the conversion of keyword objects which are included in a Visual format resource file, and to provide conversion code in the future for keywords which have not been created yet (Step 216).

Once processing for all of the keyword objects in the Visual format resource file has been completed, processing ends, and the output file contains a text format resource file which may be utilized with programs written in a variety of languages in accordance with known techniques for the handling of standard resource files.

While the present invention has been described in terms of a Java language builder tool, the builder tool described herein may be written in many other languages. And, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

I claim:

1. A resource file builder tool including computer readable code included on media for enabling the creation of resource files, comprising:

a class library including a keyword class for each keyword includable in a resource file being developed, each of the keywords having a selectable iconic representation displayable in a graphical user interface of said resource file builder tool;

first subprocesses for permitting a user to select one of the keyword classes by selecting one of the iconic representations;

second subprocesses for prompting the developer to input keyword data for the selected keyword class;

third subprocesses for saving an instance of the selected keyword class having the input keyword data as instance data within the resource file; and fourth subprocesses for determining whether the saved instance data affects the instance data for any other saved instance of any of the keyword classes within the resource file, and updating the instance data which is affected.

2. A visual resource file builder tool comprising computer readable code stored on media for permitting a developer to visually construct a resource file, comprising:

a plurality of keyword classes, one corresponding to each keyword includable in a resource file being developed;

selectable visual representations of each of said keyword classes;

first subprocesses for creating a properties sheet for display to the user which prompts the user to input keyword data upon selection of a visual representation of a keyword class;

second subprocesses for creating a keyword object of the keyword class after the developer has input keyword data into the properties sheet and saved the properties sheet, the keyword object including the input keyword data;

third subprocesses for creating a visual representation of the saved keyword object for display; and fourth subprocesses for determining whether input keyword data saved with the keyword object affects other keyword data in any other keyword object, and updating the other keyword data in the other keyword objects if the keyword data is affected.

3. A visual resource file builder tool according to claim 2, further comprising fifth subprocesses which, upon selection of the visual representation of the keyword object, displays the properties sheet for the keyword object for permitting the user to modify the keyword data previously saved with the keyword object.

4. Computer readable code for providing national language support for an application using multiple resource files and a visual resource file builder which permits the review of a translated text in context prior to compiling or building the application, comprising:

a first resource file including a define keyword having define data which defines text in a target language for predetermined strings; and a second resource file displayed in a visual format including visual representations for each keyword and its keyword data included in the second resource file, the second resource file including via an include keyword said first resource file and visually illustrating strings which are translated by the define keyword data in said first resource file as keyword data for a stringtable keyword included in said second resource file.

5. In a computing environment, a system for providing national language support for an application through the use of a translation resource file external to the application, comprising:

a translation resource file including text in a target language for predetermined strings; and means for accessing said translation resource file from a resource file in the application, the resource file obtaining from said translation resource the text in the target language for the predetermined strings.

* * * * *